Figure 1:
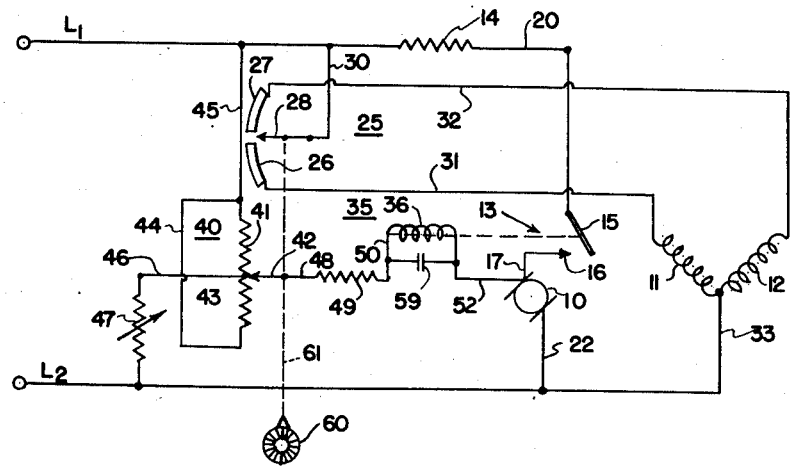

April 13, 1954  R. J. KUTZLER  2,675,511
MOTOR CONTROL APPARATUS
Filed Sept. 17, 1952

*INVENTOR.*
ROBERT J. KUTZLER
BY
George H. Fisher
*ATTORNEY*

Patented Apr. 13, 1954

2,675,511

UNITED STATES PATENT OFFICE 2,675,511

MOTOR CONTROL APPARATUS

Robert J. Kutzler, Minneapolis, Minn., assignor to Minneapolis-Honeywell Regulator Company, Minneapolis, Minn., a corporation of Delaware Application September 17, 1952, Serial No. 310,066

20 Claims. (Cl. 318—257)

My invention relates to an improvement of control apparatus and in particular to a motor control apparatus in which speed of operation of a motor is controlled by applying and controlling pulsed increments of electrical energy to said motor.

The control of the speed of operation of an electric motor through variation in the amount of energizing power the motor receives is a well recognized phenomenon, particularly in the field of direct current motors. Further, speed control of the direct current type of machine has been accomplished through the application of pulse increments of power to the armature of the machine. This latter method of speed control has previously required extensive electrical and electronic apparatus or mechanical apparatus for controlling the pulsed rate of energy to the machine and for this reason it has not been advisable or economical to use in most applications. In the subject invention, speed control of a machine is very simply accomplished by the operation of a relay device having contacts or circuit closure elements in the energizing circuit for the armature of the D. C. machine and one or more energizing coils in the control circuit for operating the contact or circuit closure mechanism. Directional control of the machine is obtained through the use of directional field windings which are selectively switched into the energizing circuit for the motor simultaneously with the operation of a primary controller which controls initially the energization of the relay. Change in the electrical characteristics of the motor armature through the generation of counter-E. M. F. in proportion to the speed of operation of the motor is also utilized in controlling operation of the relay and the circuit closure mechanism which controls the energization of the motor armature. This change in electrical characteristics of the motor armature through the counter-E. M. F. generated thereby is applied to the relay in opposition to the energization from a primary controller to determine the period of time during which the circuit closure means is in a circuit closure position delivering power to the motor armature, the period of time during which the circuit closure means is in an open position and the armature is deenergized, and the frequency or rate of pulsed operation of the relay means to provide for the speed control of the motor.

It is therefore an object of this invention to provide an improved motor control apparatus for an electric motor.

It is further an object of this invention to provide a motor control apparatus in which pulsed increments of electrical energy are supplied to a motor to control the speed thereof through the use of simplified electrical control devices.

It is also an object of this invention to provide in an improved motor control apparatus a pulsing relay which controls the increments of electrical energy supplied to the motor in proportion to the operation of a primary controller.

Figure 2:
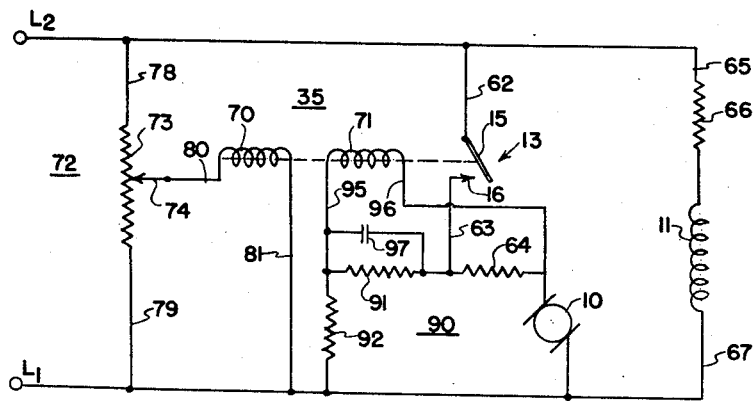

Another object of this invention is to provide in a motor apparatus an arrangement in which the electrical characteristics of the motor control the frequency of application of energy to the motor and the amount of energy applied to the motor. These and other objects of this invention will become apparent from the reading of the attached description wherein:

Figure 1 is a schematic circuit of my improved motor control apparatus and Figure 2 is another embodiment of my invention in the form of a schematic circuit of a motor control apparatus.

My invention, as shown in Figure 1, is applied to a direct current type motor having an armature 10 and a pair of directional field windings 11 and 12. Energization of the armature 10 and field windings 11 and 12 is provided in my improved motor control apparatus from a D. C. source of power connected to power leads L1 and L2. Armature 10 of the motor is energized through an energizing circuit from L1, L2 which includes a limiting resistor 14 and a contact mechanism or circuit closure means 13 having a movable element 15 and a stationary element 16. This energizing circuit is as follows: L1 to resistor 14, conductor 20 to movable contact 15 of the circuit closure 13, stationary contact 16 to conductor 17, armature 10 to conductor 22, to L2. The energizing circuit for the directional field windings 11 and 12 includes a switching mechanism 25 having a pair of stationary contact elements 26, 27 and a cooperating movable contact element 28. This energizing circuit extends from L1 through a conductor 30 to movable contact element 28 and from stationary contact elements 26 or 27 through conductors 31 or 32 respectively to directional field windings 11 or 12 respectively and from the field windings through a conductor 33 to L2. The circuit closure means 13 is actually the contact mechanism of a relay indicated generally at 35 having an operating coil 36 and suitable magnetic structure (not shown) which operates to actuate the circuit closure member or move the movable element 15 into and out of engagement with the stationary element 16. Closure of the circuit closure means 13 completes the energizing circuit to the armature 10 of the motor to apply a power to the same. Speed control, as will be later noted, of this D. C. motor is effected by controlling the pulsed rate of circuit closure or frequency of circuit closure, the duration of time during which this circuit is closed, and similarly the duration of time in which the circuit is open to control the amount of power applied to the armature 10. The relay 35 or its coil 36 is energized through a controlling circuit including a primary controller indicated at 40 in the form of a tapped potentiometer having a winding 41 and a movable wiper element 42. Winding 41 of the primary controller 40 has a center tap thereon, as at 43, and the extremities of the winding are connected together through a conductor 44 and through a conductor 45 to L1. The center tap connection 43 of the resistor or winding 41 is connected to conductor L2 through a conductor 46 and a variable resistor element 47. Wiper 42 of potentiometer 40 is connected to coil 36 of relay 35 through a conductor 48, resistor 49 and conductor 50. Coil 36 is connected at its opposite extremity to the one side of the armature 10 of the motor through a conductor 52 and this circuit may be completed either through the contact mechanism 13 to L1 or through the armature 10 to L2 as will be evident as the disclosure proceeds. A condenser 59 is connected in parallel with a coil 36. As will be seen from the drawings, the primary controller 40 of the control circuit for relay 35 is energized across L1, L2 through the resistor 47 and conductors 45, 46. The primary controller or potentiometer is identical in both directions of movement of the wiper 42 from the center tap 43 inasmuch as the extremities of the potentiometer are connected together at a common point by the conductor 44 such that the displacement to either side of the wiper 42 the same distance relative to the center tap 43 will impress on the coil 36 of relay and equal potential of the same magnitude and polarity. The energizing circuit for the primary controller of potentiometer 40 referred to above is only part of the control circuit for the relay 35 which operates the circuit closure means 13 or contacts 15 and 16. It will be evident that movement of the wiper 42 on the resistance 41 produces a signal or voltage change at the wiper which will be applied to the coil 36 through the resistor 49. The wiper 42 is operated through a manual controller indicated schematically at 60, shaft 61 of which is shown in phantom to connect to the wiper 42 and also to the movable blade 28 of the switching means 25.

For the purpose of explaining the operation of the circuit of Figure 1, it will be assumed that L2 is the plus side of the D. C. source of power. Assuming a condition in which the wiper 42 is positioned adjacent the center tap 43 at winding 41 and the circuit closure means 13 open together with the positioning of the movable contact 28 midway between the stationary contacts 26, 27 of the switching device 25 but not in contact thereof, it will be seen that rotation of the manual element 60 will move the wiper 42 and the movable contact 28 of the switching element 25 in one direction or the other to engage respectively a portion of the potentiometer winding 41 away from the center tap 43 and one or the other of the stationary contacts 26, 27. As the wiper 42 is moved along the resistance element 41 a current will flow to an energizing circuit for the relay coil 36 as follows: L2, conductor 22, armature 10, conductor 52, coil 36, resistor 49, conductor 48, to wiper 42, a portion of the resistance winding 41, conductor 45 to L1. When the wiper 42 has moved far enough along resistance element 41, the resistance in this circuit will be decreased and the current increased to a point where the coil 36 will be energized and the relay contacts or circuit closure means 13, that is the contacts 15, 16, will pull in or close. Simultaneously with this amount of movement, the movable contact 28 will have engaged one or the other of the stationary contacts 26, 27 to connect one or the other of the field windings 11 or 12 across the source of power evidenced by L1, L2. With the closure of the relay contacts, the motor begins to run due to current flow through the energizing circuit for the armature including the resistor 14 as described above. As soon as the contacts 15 and 16 close, a current flow through a second energizing circuit for the relay coil 36 will be provided as follows: L2, resistor 47, conductor 46, to the center tap 43 of winding 41, winding 41, to wiper 42, conductor 48, resistor 49, conductor 50, coil 36, conductor 52, conductor 17, contacts 15, 16, conductor 20, resistor 14, to L1. The current in this energizing circuit will flow through the relay coil in a direction in opposition to the before-mentioned energizing circuit and will tend to open the relay contacts and cause the motor to cease running. When the contacts of the closure means 13 of relay 36 are opened, current in this energizing circuit will cease and the before-mentioned energizing circuit for the relay coil 36 will become effective to close the relay contacts or closure means 13 again. Moving the wiper 42 toward the respective extremities of the winding or resistance element 41 of the primary controller 40 will tend to decrease the impedance in the energizing circuit which causes the relay 35 to pull in and increase the impedance in the energizing circuit which causes the relay to drop out. Thus the relay will hold in longer, because of the greater time required to build up enough current in the drop-out energizing circuit to overcome the current tending to hold the relay in. With the relay contacts or circuit closure means made or closed for a longer percentage of time, the average current through the motor armature 10 will increase and the motor will consequently run faster. Regulation of the speed of rotation of the armature 10 will be obtained in this system through the counter-E. M. F. or electromotive force generated in the armature due to rotation in the presence of the directional field windings 11 or 12. This counter-E. M. F. in the motor armature will tend to decrease the current flowing in the energizing circuit for the relay coil tending to pull the relay in or operate the circuit closure means 13 to a closed position as the armature approaches a speed called for by the setting or position of the wiper 42 of the primary controller 40. With the primary controller set in a certain position indicating a certain desired speed of operation of the motor, the current tending to pull the relay in will have a certain value before the motor or armature 10 begins to rotate. As the armature 10 starts to rotate and build up speed, its effective impedance is increased due to the back or counter-E. M. F. of the motor, thereby reducing the current in the energizing circuit of the relay 35 for the pull-in direction. Thus, as the armature picks up speed, the current tending to open the circuit closure means 13, that is in the energizing circuit for the relay which does not include the armature 10, does not have to build up to as high a value as it would if the motor or armature 10 were not turning in order to drop out the relay 35. It can also be seen that if the armature or motor were to become loaded down it would not turn as fast and less counter-E. M. F. would be generated thereby, hence the relay 35 would tend to hold in longer increasing the average motor current and the motor would have an increased torque output.

Thus as the wiper 42 of the primary controller is moved away from the center tap 43 thereof in either direction, the relative on time or circuit closure time of relay 35 is increased and this increases the length of current pulses to the motor or armature 10, consequently increasing the average current to the motor and increasing the motor speed. It will also be seen that directional control of the motor is obtained through the energization of one or the other of the field windings 11 or 12 which are inserted into the energizing circuit of the motor through operation of the manual control as the wiper 42 is displaced along the winding 41 of the primary controller. The inclusion of the condenser 59 and resistor 49 in the energizing circuits of the relay coil 36 tend to limit the amount of current flow through the armature and vary the rate of build up of current in the relay coil to alter the on time of the closure means 13. The pulsing rate at which the relay 35 will be operated can be adjusted by varying the electrical quantities of these components.

The embodiment of my motor control apparatus shown in Figure 2 utilizes only one directional field winding 11 and consequently is unidirectional in operation. It is to be understood, however, that the bi-directional control or type of control disclosed in Figure 1 may be applied to this circuitory apparatus also. The energizing circuit for the motor armature 10 includes the conductors L1, L2 which are adapted to be connected to a D. C. source of power and also includes the circuit closure means 13 including the movable contact 15 and stationary contact 16 of the relay 35. This energizing circuit is as follows: L2 to conductor 62, movable contact 15 to stationary contact 16 of the circuit closure means 13, conductor 63, resistor 64, and armature 10 to conductor L1. Directional field winding 11 is also connected in a shunt field arrangement or circuitory being connected to conductor L2 by a conductor 65 in series with a resistance 66 and a conductor 67 to conductor L1. Relay 35 in this embodiment includes two coils 70 and 71 which as will be later noted act in opposition to one another in contrast to the utilization of a single coil in the embodiment of Figure 1 in which current flow through the energizing coil 36 was in opposite directions to actuate the contact or circuit closure means 13 between opposite circuit controlling positions. A primary controller or potentiometer 72 which includes a resistance element 73 and a wiper 74 controls the energization of the coil 70 across the source of power in a first energizing circuit for the relay 35. This circuit is as follows: Conductor L2 to conductor 78, resistor 73 to conductor 79, to conductor L1. Wiper 74 of potentiometer or controller 72 is connected by conductor 80 to coil 70 and from coil 70 through a conductor 81 to line L1. Coil 71 of relay actuator 35 is connected across a Wheatstone bridge circuit indicated schematically at 90, the bridge circuit including as legs the armature 10, resistor 64, a resistor 91, and a resistor 92, all resistor elements and the armature being connected in a series relationship. Input terminals to the bridge are formed by the conductor 63 and line L1 and the coil 71 is connected to output terminals defined by the common connection between resistors 91, 92 and resistor 64 and armature 10 through conductors 95, 96. Resistor 91 also has a condenser 97 connected in parallel connection therewith for purposes to be later noted. While manual means for operating the wiper 74 of the potentiometer 72 is not shown, such is to be understood.

The operation of this embodiment of the motor control apparatus is similar to that of the before-mentioned embodiment of Figure 1 in that operation of the relay 35 provides for pulsed operation of the circuit closure means to provide pulsed increments of power to the armature of the motor for speed control purposes. The energization of the coil 70 of relay 35 from the primary controller or potentiometer 72 is largely conventional, the potentiometer operating as a voltage dividing device which impresses a variable signal upon the coil 70 depending upon the position of the wiper 74 of the potentiometer 72. Assuming again that L2 is the plus or hot side of the D. C. supply, movement of the wiper 74 from the extremity of the winding 73 common to conductor 79 and toward the extremity common to the conductor 78 will decrease the resistance in the energizing circuit for the coil 70 and increase the current flow through the coil to cause the relay 35 to pull in or operate the circuit closure means 13 to an energized position. Until the circuit closure means is moved to a circuit closed position, it will be seen that no voltage or signal will be supplied to the Wheatstone bridge circuit of which the armature forms one leg thereof and consequently the coil 71 will be deenergized. Upon closure of the circuit closure means 13, the power source L1, L2 will be connected to the bridge 90 at conductor L1 and conductor 63. The resistance elements 64, 91 and 92 are so chosen that the resistance quantity of the element 64 will match that of the no load impedance of the armature 10 and the elements 91, 92 will be of a relatively high impedance with respect to the armature and resistor 64. This will provide for a low impedance path to the enegizing circuit of the armature 10 through the resistor 64 and across a source of power L1, L2 to the circuit closure means 13. As in the previously described embodiment, the rotation of the armature when so energized will vary the impedance of the armature due to the counter-E. M. F. generated thereby to unbalance the bridge circuit and cause a current flow through the coil 71 in such a direction as to provide a magnetic force to the relay core structure (not shown) in opposition to the effect or operation of the coil 70 and of such magnitude as to tend to overcome the effect of the energization of coil 70 and cause the relay to move to a circuit open position. Thus coil 70 operates to close the circuit closure means and energize the armature 10 and coil 71 to open the circuit closure means and overcome the effect of the operation or energization of coil 70. The duration during which the circuit closure means is in an on or closed position will be determined by the build-up of current in the coil 71 which is effected by the change in the impedance of the bridge or armature through change in impedance in the armature 10. Thus the pulsing operation is obtained and it will be seen that by movement of the wiper 74 of the potentiometer 72 toward the hot side of the line or increasing the energization of coil 70 will increase the on periods or the length of the on periods to increase the amount of power supplied to the motor and thereby vary its speed. Condenser 97 which is included in parallel with the resistor 91 of the bridge 90 also operates to unbalance the bridge initially upon energization due to closure of the circuit closure means 13, thus allowing the current in coil 71 to build up more rapidly and open the circuit closure means 13. The size of this condenser and its operation in the bridge circuit or energizing control circuit for the relay 35 is such as to vary the amount of on time for the relay and aid in the variation in the pulsed rate of the operation of the circuit closure means 13 to effect speed control for the motor. As previously noted, it will be understood that this motor control apparatus may be applied to a motor having a plurality of directional field coils in the same manner as that disclosed in connection with the embodiment of Figure 1.

In considering this invention it should be kept in mind that the present disclosure is intended to be illustrative only and the scope of the invention is to be determined only by the appended claims.

I claim:

1. In a motor control apparatus, a motor whose speed and direction of rotation is to be controlled, said motor having an armature and a pair of directional field windings, an energizing circuit means for said motor connected to said armature and said directional field windings, circuit closure means included in said energizing circuit means for controlling the energization of said armature, electromagnetic means for operating said circuit closure means, a primary controller connected to and energized from said energizing circuit means, means connecting said electromagnetic means to said primary controller and said armature such that said electromagnetic means is energized from said primary controller and from the counter-E. M. F. of said armature, switching means included in said energizing circuit means for said field windings, and manual means operatively connected to said primary controller and said switching means and adapted to simultaneously operate said switching means and vary the energization of said electromagnetic means from said primary controller.

2. In a motor control apparatus, a motor whose speed and direction of rotation is to be controlled, said motor having an armature and a pair of directional field windings, an energizing circuit means for said motor connected to said armature and said directional field windings, circuit closure means included in said energizing circuit means for controlling the energization of said armature, electromagnetic means for operating said circuit closure means, a primary controller connected to and energized from said energizing circuit means, means connecting said electromagnetic means to said primary controller and said armature such that said electromagnetic means is energized from said primary controller and from the counter-E. M. F. of said armature, switching means included in said energizing circuit means for said field windings, manual means operatively connected to said primary controller and said switching means and adapted to simultaneously operate said switching means and vary the energization of said electromagnetic means from said primary controller, and means modifying the rate of energization of said electromagnetic means.

3. In a motor control apparatus, a motor whose speed and direction of rotation is to be controlled, said motor having an armature and a directional field winding, and energizing circuit means for said motor connected to said armature and said directional field winding, circuit closure means included in said energizing circuit means for controlling the energization of said armature, electromagnetic means for operating said circuit closure means, a primary controller connected to and energized from said energizing circuit means, means connecting said electromagnetic means to said primary controller and said armature such that said electromagnetic means is energized from said primary controller and from the counter-E. M. F. of said armature, manual means operatively connected to said primary controller and adapted to operate said controller to vary the energization of said electromagnetic means, and means connected to said electromagnetic means for modifying the rate of energization of said electromagnetic means.

4. In a motor control apparatus, a motor whose speed and direction of rotation is to be controlled, said motor having an armature and a pair of directional field windings, an energizing circuit means for said motor connected to said armature and said directional field windings, circuit closure means included in said energizing circuit means for controlling the energization of said armature, electromagnetic means for operating said circuit closure means, a primary controller connected to and energized from said energizing circuit means, means connecting said electromagnetic means to said primary controller and said armature such that said electromagnetic means is energized from said primary controller and from the counter-E. M. F. of said armature, switching means included in said energizing circuit means for said field windings, manual means operatively connected to said primary controller and said switching means and adapted to simultaneously operate said switching means and vary the energization of said electromagnetic means from said primary controller, and condenser means connected in parallel with said electromagnetic means for modifying the rate of energization of said electromagnetic means.

5. In a motor control apparatus, a motor whose speed is to be controlled, said motor having an armature and directional field windings, an energizing circuit means for said motor adapted to be connected to a source of power and connected to said armature and said field windings, relay means including contacts operated thereby and at least one operating coil, said contact means being included in said energizing circuit means in series with said armature, a primary controller adapted to be energized from said source of power, means connecting said coil of said relay to said primary controller and to the energizing circuit of said energizing circuit means such that said coil is energized from said primary controller and from a counter-E. M. F. of said armature, switching means connected to said energizing circuit means and in a series relationship with said directional field windings for connecting at least one of said field windings in said energizing circuit means for each of a pair of operating positions of said switching means, and manual means operatively connected to said primary controller and said switching means and adapted to simultaneously operate said primary controller and said switching means to vary the energization of said relay coil and said armature and operate said switching means to one or the other of its operating positions to energize said one or the other of said field windings.

6. In a motor control apparatus, a motor whose speed is to be controlled, said motor having an armature and directional field windings, an energizing circuit means for said motor adapted to be connected to a source of power and connected to said armature and said field windings, relay means including contacts operated thereby and at least one operating coil, said contact means being included in said energizing circuit means in series with said armature, a primary controller adapted to be energized from said source of power, means connecting said coil of said relay to said primary controller and to the energizing circuit of said energizing circuit means such that said coil is energized from said primary controller and from a counter-E. M. F. of said armature, switching means connected to said energizing circuit means and in a series relationship with said directional field windings for connecting at least one of said field windings in said energizing circuit means for each of a pair of operating positions of said switching means, manual means operatively connected to said primary controller and said switching means and adapted to simultaneously operate said primary controller and said switching means to vary the energization of said relay coil and said armature and operate said switching means to one or the other of its operating positions to energize said one or the other of said field windings, and means connected to said relay coil and energized from said primary controller for modifying the rate of energization of said relay coil to modify the operation of said relay.

7. In a motor control apparatus, a motor whose speed is to be controlled, said motor having an armature and a field winding, an energizing circuit means for said motor connected to said armature and said field winding, circuit closure means included in said energizing circuit means for controlling the energization of said armature, electromagnetic means for operating said circuit closure means, a primary controller connected to and energized from said energizing circuit means, means connecting said electromagnetic means to said primary controller and said armature such that said electromagnetic means is energized from said primary controller and from the counter-E. M. F. of said armature, and means operatively connected to said primary controller to vary the energization of said electromagnetic means and adapted to operate said controller.

8. In a motor control apparatus, a motor whose speed is to be controlled, said motor having an armature and directional field windings, an energizing circuit means for said motor adapted to be connected to a source of power and connected to said armature and said field windings, relay means including contacts operated thereby and at least one operating coil, said contact means being included in said energizing circuit means in series with said armature, a primary controller adapted to be energized from said source of power, means connecting said coil of said relay to said primary controller and to the energizing circuit of said energizing circuit means such that said coil is energized from said primary controller and from a counter-E. M. F. of said armature, switching means connected to said energizing circuit means and in a series relationship with said directional field windings for connecting at least one of said field windings in said energizing circuit means for each of a pair of operating positions of said switching means, manual means operatively connected to said primary controller and said switching means and adapted to simultaneously operate said primary controller and said switching means to vary the energization of said relay coil and said armature and operate said switching means to one or the other of its operative positions to energize said one or the other of said field windings, and condenser means connected to said relay coil to provide for pulsed operation of said relay means.

9. In a motor control apparatus, a motor whose speed is to be controlled, said motor having an armature and a directional field winding, an energizing circuit means for said motor adapted to be connected to a source of power, said circuit means being connected to said armature and said directional pair of windings, circuit closure means included in said energizing circuit means for controlling the energization of said armature, electromagnetic means including a pair of coils for operating said circuit closure means in a pulsed type of operation for variably controlling the power supply to said armature to vary the speed of rotation of said motor, a primary controller adapted to be connected to said source of power, means connecting one of said coils to said primary controller to be energized by the output of said primary controller, means connecting the other of said coils to said armature to be energized in accordance with the speed of rotation of said armature, said coils of said electromagnet acting against one another to move said circuit closure means between a circuit open and a circuit closure position, and manual means operatively connected to said primary controller and adapted to operate said controller to vary the energization of said electromagnetic means and said armature.

10. In a motor control apparatus, a motor whose speed is to be controlled, said motor having an armature and a directional field winding, an energizing circuit means for said motor adapted to be connected to a source of power, said circuit means being connected to said armature and said directional pair of winding, circuit closure means included in said energizing circuit means for controlling the energization of said armature, electromagnetic means including a pair of coils for operating said circuit closure means in a pulsed type of operation for variably controlling the power supply to said armature to vary the speed of rotation of said motor, a primary controller adapted to be connected to said source of power, means connecting one of said coils to said primary controller to be energized by the output of said primary controller, means connecting the other of said coils to said armature to be energized in accordance with the speed of rotation of said armature, said coils of said electromagnet acting against one another to move said circuit closure means between a circuit open and a circuit closure position, manual means operatively connected to said primary controller and adapted to operate said controller to vary the energization of said electromagnetic means and said armature, and means connected to one of said coils for modifying the length of time in which the circuit closure means is in its circuit closure position.

11. In a motor control apparatus, a motor whose speed is to be controlled, said motor having an armature and a directional field winding, an energizing circuit means for said motor adapted to be connected to a source of power, said circuit means being connected to said armature and said directional pair of windings, circuit closure means included in said energizing circuit means for controlling the energization of said armature, electromagnetic means including a pair of coils for operating said circuit closure means in a pulsed type of operation for variably controlling the power supply to said armature to vary the speed of rotation of said motor, a primary controller adapted to be connected to said source of power, means connecting one of said coils to said primary controller to be energized by the output of said primary controller, means connecting the other of said coils to said armature to be energized in accordance with the speed of rotation of said armature, said coils of said electromagnet acting against one another to move said circuit closure means between a circuit open and a circuit closure position, manual means operatively connected to said primary controller and adapted to operate said controller to vary the energization of said electromagnetic means and said armature, and condenser means connected in parallel with one of said coils to vary the rate of pulsed operation of said electromagnetic means.

12. In a motor control apparatus, a motor whose speed is to be controlled, said motor having an armature and a directional field winding, an energizing circuit means for said motor adapted to be connected to a source of power, said circuit means being connected to said armature and said directional pair of winding, circuit closure means included in said energizing circuit means for controlling the energization of said armature, electromagnetic means including a pair of coils for operating said circuit closure means in a pulsed type of operation for variably controlling the power supply of said armature to vary the speed of rotation of said motor, a primary controller adapted to be connected to said source of power, means connecting one of said coils to said primary controller to be energized by the output of said primary controller, means including a plurality of resistors connected to said armature and to said energizing circuit means to form a Wheatstone bridge circuit with said armature in one leg of said bridge and energized from said energizing circuit means, means connecting the other of said coils to said bridge circuit to be energized by the output signals from said bridge circuit, and manual means operatively connected to said primary controller and adapted to operate said controller to vary the energization of said electromagnetic means and said armature.

13. In a motor control apparatus, a motor whose speed is to be controlled, said motor having an armature and a directional field winding, an energizing circuit means for said motor adapted to be connected to a source of power, said circuit means being connected to said armature and said directional field winding, circuit closure means included in said energizing circuit means for controlling the energization of said armature, electromagnetic means including a pair of coils for operating said circuit closure means in a pulsed type of operation for variably controlling the power supply to said armature to vary the speed of rotation of said motor, a primary controller adapted to be connected to said source of power, means connecting one of said coils to said primary controller to be energized by the output of said primary controller, means including a plurality of resistors connected to said armature and to said energizing circuit means to form a Wheatstone bridge circuit with said armature in one leg of said bridge and energized from said energizing circuit means, means connecting the other of said coils to said bridge circuit to be energized by the output signals from said bridge circuit, manual means operatively connected to said primary controller and adapted to operate said controller to vary the energization of said electromagnetic means and said armature, and means connected to one of said legs of said bridge circuit to modify the energization of said other of said coils of said electromagnetic means.

14. In a motor control apparatus, a motor whose speed is to be controlled, said motor having an armature and a directional field winding, an energizing circuit means for said motor adapted to be connected to a source of power, said circuit means being connected to said armature and said directional field winding, circuit closure means included in said energizing circuit means for controlling the energization of said armature, electromagnetic means including a pair of coils for operating said circuit closure means in a pulsed type of operation for variably controlling the power supply to said armature to vary the speed of rotation of said motor, a primary controller adapted to be connected to said source of power, means connecting one of said coils to said primary controller to be energized by the output of said primary controller, means including a plurality of resistors connected to said armature and to said energizing circuit means to form a Wheatstone bridge circuit with said armature in one leg of said bridge and energized from said energizing circuit means, means connecting the other of said coils to said bridge circuit to be energized by the output signals from said bridge circuit, manual means operatively connected to said primary controller and adapted to operate said controller to vary the energization of said electromagnetic means and said armature, and condenser means connected in parallel with one of said legs of said bridge to modify the energization of the other of said coils of said electromagnetic means.

15. In a motor control apparatus, a motor whose speed is to be controlled, said motor having an armature and a directional field winding, an energizing circuit means for said motor adapted to be connected to a source of power, said circuit means being connected to said armature and said directional field winding, circuit closure means included in said energizing circuit means for controlling the energization of said armature, electromagnetic means including a pair of coils for operating said circuit closure means in a pulsed type of operation for variably controlling the power supply to said armature to vary the speed of rotation of said motor, a primary controller adapted to be connected to said source of power, means connecting one of said coils to said primary controller to be energized by the output of said primary controller, means connecting the other of said coils to said armature to be energized in accordance with the speed of rotation of said armature, said coils of said electromagnet acting against one another to move said circuit closure means between a circuit open and a circuit closure position, and manual means operatively connected to said primary controller and adapted to operate said controller to vary the energization of said electromagnet means and said armature.

16. In a motor control apparatus, a motor whose speed is to be controlled, said motor having an armature and a directional field winding, an energizing circuit means for said motor adapted to be connected to a source of power, said circuit means being connected to said armature and said directional field winding, circuit closure means included in said energizing circuit means for controlling the energization of said armature, electromagnetic means including a pair of coils for operating said circuit closure means in a pulsed type of operation for variably controlling the power supply to said armature to vary the speed of rotation of said motor, a primary controller adapted to be connected to said source of power, means connecting one of said coils to said primary controller to be energized by the output of said primary controller, means including a plurality of resistors connected to said armature and to said energizing circuit means to form a Wheatstone bridge circuit with said armature in one leg of said bridge and energized from said energizing circuit means, means connecting the other of said coils to said bridge circuit to be energized by the output signals from said bridge circuit, and manual means operatively connected to said primary controller and adapted to operate said controller to vary the energization of said one of said coils.

17. In a motor control apparatus, a motor whose speed is to be controlled, said motor having an armature and a directional field winding, an energizing circuit means for said motor adapted to be connected to a source of power, said circuit means being connected to said armature and said directional field winding, circuit closure means included in said energizing circuit means for controlling the energization of said armature, electromagnetic means including a pair of coils for operating said circuit closure means in a pulsed type of operation for variably controlling the power supply to said armature to vary the speed of rotation of said motor, a primary controller adapted to be connected to said source of power, means connecting one of said coils to said primary controller to be energized by the output of said primary controller, means including a plurality of resistors connected to said armature and to said energizing circuit means to form a Wheatstone bridge circuit with said armature in one leg of said bridge and energized from said energizing circuit means, means connecting the other of said coils to said bridge circuit to be energized by the output signals from said bridge circuit, manual means operatively connected to said primary controller and adapted to operate said controller to vary the energization of said one of said coils, and electrical means connected in said Wheatstone bridge circuit for modifying the output thereof to modify the energization of said other of said coils.

18. In a motor control apparatus, a motor whose speed and direction of rotation is to be controlled, said motor having an armature and a pair of directional field windings, and energizing circuit means for said motor connected to said armature and said directional field windings, circuit closure means included in said energizing circuit means for controlling the energization of said armature, electromagnetic means for operating said circuit closure means, primary controlling means connected to and energized from said energizing circuit means, means connecting said electromagnetic means to said primary controlling means and said armature such that said electromagnetic means is energized from said primary controlling means and the counter-E. M. F. of said armature, switching means included in said energizing circuit means for said field windings and operative with the energization of said electromagnetic means, and means operatively connected to said primary controlling means for controlling the operation of the same to vary the energization of said electromagnetic means.

19. In a motor control apparatus, a motor whose speed and direction of rotation is to be controlled, said motor having an armature and a pair of directional field windings, and energizing circuit means for said motor connected to said armature and said directional field windings, circuit closure means included in said energizing circuit means for controlling the energization of said armature, electromagnetic means for operating said circuit closure means, primary controlling means connected to and energized from said energizing circuit means, means connecting said electromagnetic means to said primary controlling means and said armature such that said electromagnetic means is energized from said primary controlling means and the counter-E. M. F. of said armature, switching means included in said energizing circuit means for said field windings and operative substantially simultaneously with the energization of said electromagnetic means, and means adapted to be operated upon a need for operation of said motor for controlling the operation of said primary controlling means to vary the energization of said electromagnetic means.

20. In a motor control apparatus, a motor whose speed is to be controlled, said motor having an armature and a directional field winding, an energizing circuit means for said motor connected to said armature and said directional field winding, circuit closure means included in said energizing circuit means for controlling the energization of said armature, electromagnetic means for operating said circuit closure means, primary controlling means connected to and energized from said energizing circuit means, means connecting said electromagnetic means to said primary controlling means and said armature such that electromagnetic means is energized from said primary controlling means and from the counter-E. M. F. of said armature, and means adopted to be operated upon the need for operation of said motor for controlling the operation of said primary controlling means to vary the energization of said electromagnetic means.

References Cited in the file of this patent

UNITED STATES PATENTS

| Number | Name | Date |
|---|---|---|
| 2,440,228 | Yardeny et al. | Apr. 20, 1948 |

FOREIGN PATENTS

| Number | Country | Date |
|---|---|---|
| 84,276 | Sweden | Sept. 11, 1935 |